US007076782B2

(12) United States Patent
Smith (10) Patent No.: US 7,076,782 B2
(45) Date of Patent: Jul. 11, 2006

(54) METHOD, COMPUTER PROGRAM PRODUCT, AND SYSTEM FOR CREATING FORM INDEPENDENT APPLICATIONS OPERATIVE ON IMS RESOURCES

(75) Inventor: Alan R. Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 09/778,236

(22) Filed: Feb. 6, 2001

(65) Prior Publication Data

US 2002/0107902 A1 Aug. 8, 2002

(51) Int. Cl.
*G06F 9/46* (2006.01)
(52) U.S. Cl. ....................................... 718/104
(58) Field of Classification Search ............. 718/1, 718/100–108; 711/100–221
See application file for complete search history.

(56) References Cited

U.S. PATENT DOCUMENTS

| | | | | |
|---|---|---|---|---|
| 5,155,678 A | * | 10/1992 | Fukumoto et al. | 707/202 |
| 5,230,049 A | | 7/1993 | Chang et al. | 395/700 |
| 5,390,314 A | | 2/1995 | Swanson | 395/500 |
| 5,448,740 A | | 9/1995 | Kiri et al. | 395/700 |
| 5,745,748 A | * | 4/1998 | Ahmad et al. | 707/10 |
| 5,758,333 A | * | 5/1998 | Bauer et al. | 707/1 |
| 5,761,667 A | * | 6/1998 | Koeppen | 707/101 |
| 5,960,200 A | * | 9/1999 | Eager et al. | 717/147 |
| 5,991,761 A | * | 11/1999 | Mahoney et al. | 707/100 |
| 6,137,763 A | * | 10/2000 | Dahan et al. | 369/95 |

FOREIGN PATENT DOCUMENTS

| | | |
|---|---|---|
| JP | 11-149480 A | 6/1999 |
| JP | 11-272658 A | 10/1999 |

OTHER PUBLICATIONS

"The Data Link Interface", Network Programmer's Guide, //grove.ufl.edu/usr/share/doclib/online/DOCS/HTML/APS2WDTE/DOCU_005.HTM.
"D.7 Program specification blocks for GDDM applications", IBM Book Manager Book Server Copyright 1989, 1996 IBM Corporation.

* cited by examiner

*Primary Examiner*—Thomas Lee
*Assistant Examiner*—Kenneth Tang
(74) *Attorney, Agent, or Firm*—Kunzler & Associates (57) ABSTRACT

A form independent application program operation is performed on one or more Information Management System (IMS) resources by locating the Program Control Block (PCB) associated with an IMS resource exclusive of predetermined knowledge pertaining to IMS construct form, and using the PCB to perform form independent application program operations on the IMS resource.

Constraints placed on the form of IMS constructs by an application program executing in an IMS environment are eliminated. Existing IMS constructs are utilized without predetermined knowledge of their number, type, language, order or other characteristics. An application program is enabled to use information from Program Specification Blocks (PSBs) and PCBs in their existing form, rather than requiring these IMS constructs to conform with the idiosyncrasies of the application program's implementation.

48 Claims, 9 Drawing Sheets

```
     DCL DBPTR POINTER;                        ╱─500
     DCL 1 DBPCB BASED(DBPTR),
502────2 NAME        CHAR(8),
       2 SEGLEVEL    CHAR(2),
       2 STAT        CHAR(2),
       2 PROCOPT     CHAR(4),
       2 RESERV      BIN(31),
       2 SEGNAME     CHAR(8),
       2 KFB_LEN     BIN(31),
       2 SENSEG      BIN(31),
       2 KEYFBA      CHAR(255);
```

Fig. 7

```
     DCL IOPTR POINTER;                        ╱─550
     DCL 1 IOPCB BASED(IOPTR),
552────2 NAME        CHAR(8),
       2 RESV        BIN(15),
       2 STAT        CHAR(2),
       2 LDTE        CHAR(8),
       2 PREFIX      BIN(31),
       2 MODN        CHAR(8),
554────2 USER        CHAR(8),
       2 SENSEG      BIN(31),
       2 GROUP       CHAR(8);
```

METHOD, COMPUTER PROGRAM PRODUCT, AND SYSTEM FOR CREATING FORM INDEPENDENT APPLICATIONS OPERATIVE ON IMS RESOURCES

FIELD OF INVENTION

The present invention relates to computer application programs. More specifically, the present invention relates to application programs, tools and utility programs that operate in an Information Management System (IMS) environment. (IMS is a trademark of International Business Machines Corporation in the United States, other countries, or both.) The present invention provides for performing application programming tasks without predetermined knowledge pertaining to the language affiliated with relevant Program Specification Blocks (PSBs) or predetermined knowledge pertaining to the quantity, type, order or other characteristics of relevant Program Control Blocks (PCBs).

BACKGROUND

IMS is a hierarchical database management system (HDBMS) developed by International Business Machines Corporation. IMS has wide spread usage in many large enterprises where high transaction volume, reliability, availability and scaleability are of the utmost importance. While IMS provides the software and interfaces for running the businesses of many of the world's large corporations, a company typically makes a significant investment in IMS application programs in order to have IMS perform useful work for the enterprise. IMS application programs are typically coded in COBOL, PL/I, C, PASCAL or assembly language. These application programs perform IMS database functions by making Data Language One (DL/I) calls to invoke the needed IMS processing.

Sometimes an application program is custom developed by a company for its exclusive use on a particular IMS system. However, there is a different class of application programs known in the art as tools, utilities, or utility programs (henceforth referred to as utility programs). These utility programs are frequently developed by a software provider to perform tasks that are very common for many IMS installations, thereby saving a significant amount of work otherwise expended in developing custom applications to perform very common tasks. For example, unloading and reloading IMS databases for the purposes of backup/recovery or performance tuning are very common tasks for which numerous utility programs have been developed.

The use of these utility programs may save significant time when compared to the laborious process of developing comparable custom application programs. However, the ease with which these utility programs are deployed can be greatly improved. Problems may occur because the developer of a utility program typically has little or no knowledge of the form of specific IMS data structures or constructs (henceforth referred to as constructs) associated with IMS resources that exist for a particular IMS installation in which the utility program is intended to execute. Indeed, a software provider typically intends that a utility program be deployed across numerous IMS systems over various times resulting in significant unpredictability about the nature of the IMS constructs that may exist during the utility program's execution on a particular system at a given time. While the above problems may occur with any IMS application program, they are more likely to occur in conjunction with utility programs where the potential for a wider scope of deployment results in an increased diversity of encountered IMS construct forms.

These compatibility issues may force a user of a prior art utility program to create or modify the needed IMS constructs to conform with the requirements of the utility program. Adhering to these requirements prior to using the utility program may present problems to the user. First, making custom adjustments to the IMS constructs to adhere to the utility program requirements typically involves contacting an IMS database administrator with the specialized knowledge and authorization necessary to make these changes. The IMS database administrator may not be immediately available to perform such tasks, potentially resulting in even further delays beyond that which the actual work requires. Second, this process is error prone because of the great precision required when making changes to IMS constructs and the additional communication required between the utility program user and the database administrator. Further, the exacting requirements of a utility program are not always clearly documented, nor are they always noticed, potentially resulting in the discovery of these requirements only after encountering disruptive error conditions when trying to execute the utility program.

Typically, using an IMS utility program for the first time involves completing a PSB generation process (PSBGEN) to create PSB and PCB constructs for required IMS resources that are compatible in form with the utility program requirements. Form compatibility considerations include a specification of language, such as assembly language or COBOL, the coding of various compatibility specifications, as well as the order, quantity and types of PCB constructs to be included for the PSB. Performing these tasks is particularly annoying to a user if all of this effort must be taken even though the needed PSB and PCB constructs already exist (but are simply in the wrong form with respect to the utility program requirements.)

These problems have been recognized in the past and several attempts have been made to resolve them. For example, a Language Environment (LE) DL/I call was developed to address language compatibility problems. This interface, known in the art as CEETDLI, allows the IMS application program to achieve language independence. However, the interface only partially resolves all of the above identified problems and additionally introduces another weakness. Namely, this solution is only practical if the developer's IMS system and all target IMS systems on which the application program may eventually execute are enabled for LE processing. It is frequently impractical for a software provider to know this information in advance.

Another DL/I call has been developed, known in the art as AIBTDLI, as an attempt to address these problems. This interface allows the programmer to pass the name of the required PCB rather than having to predetermine the PCB order such that the correct PCB address could be determined from the list of passed PCB addresses. This interface falls far short of a complete solution to the above identified problems. First, this interface does not address language incompatibilities. Second, as with CEETDLI, a new similar problem is introduced in that to use this facility special requirements must be adhered to when performing the PSBGEN, such as specifying a "PCBNAME=" parameter. Thus, even if the languages were compatible, the absence of the "PCBNAME=" parameter requires that a new PSBGEN be performed in order to comply with the requirements of the AIBTDLI interface.

Other DL/I calls are known in the art; however, all of these calls are language dependent and also require that specific PCB addresses are passed in a specified predetermined order. These calls are known as ASMTDLI, PASTDLI, PLITDLI, CBLTDLI, and CTDLI for use with programming languages Assembly Language, PASCAL, PL/I, COBOL and C, respectively.

SUMMARY OF THE INVENTION

The present invention provides a method, computer program product, and system for performing form independent application program operations on one or more IMS resources. The PCB associated with an IMS resource is located exclusive of predetermined knowledge pertaining to IMS construct form. The PCB is then utilized to perform form independent application program operations on the IMS resource.

The present invention thereby eliminates constraints placed on the form of IMS constructs by an application program executing in an IMS environment. Existing IMS constructs are utilized without predetermined knowledge of their number, type, language, order or other characteristics. The present invention enables an application program to use information from PSBs and PCBs in their existing form, rather than requiring these IMS constructs to conform with the idiosyncrasies of an application program's implementation.

The method, computer program product, and system practiced in accordance with the present invention have the following advantages. First, significant time savings are achieved in providing the flexibility to use existing IMS constructs without forcing the user of the application program to perform, or direct a database administrator to perform, a PSBGEN operation. Further, the application program is easier to use with simplified operating instructions. Further still, the deployment of the application program is less prone to error where incompatibilities between the application program and related IMS constructs are not properly resolved.

BRIEF DESCRIPTION OF THE DRAWINGS

The preferred embodiments of the present invention will hereinafter be described in conjunction with the appended drawings, where like reference numbers denote the same element throughout the set of drawings.

DESCRIPTION OF THE PREFERRED EMBODIMENTS

The preferred embodiment in accordance with the present invention is directed to a system, computer program product, and method for eliminating constraints typically placed on the form of IMS constructs by an application program executing in an IMS environment. The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
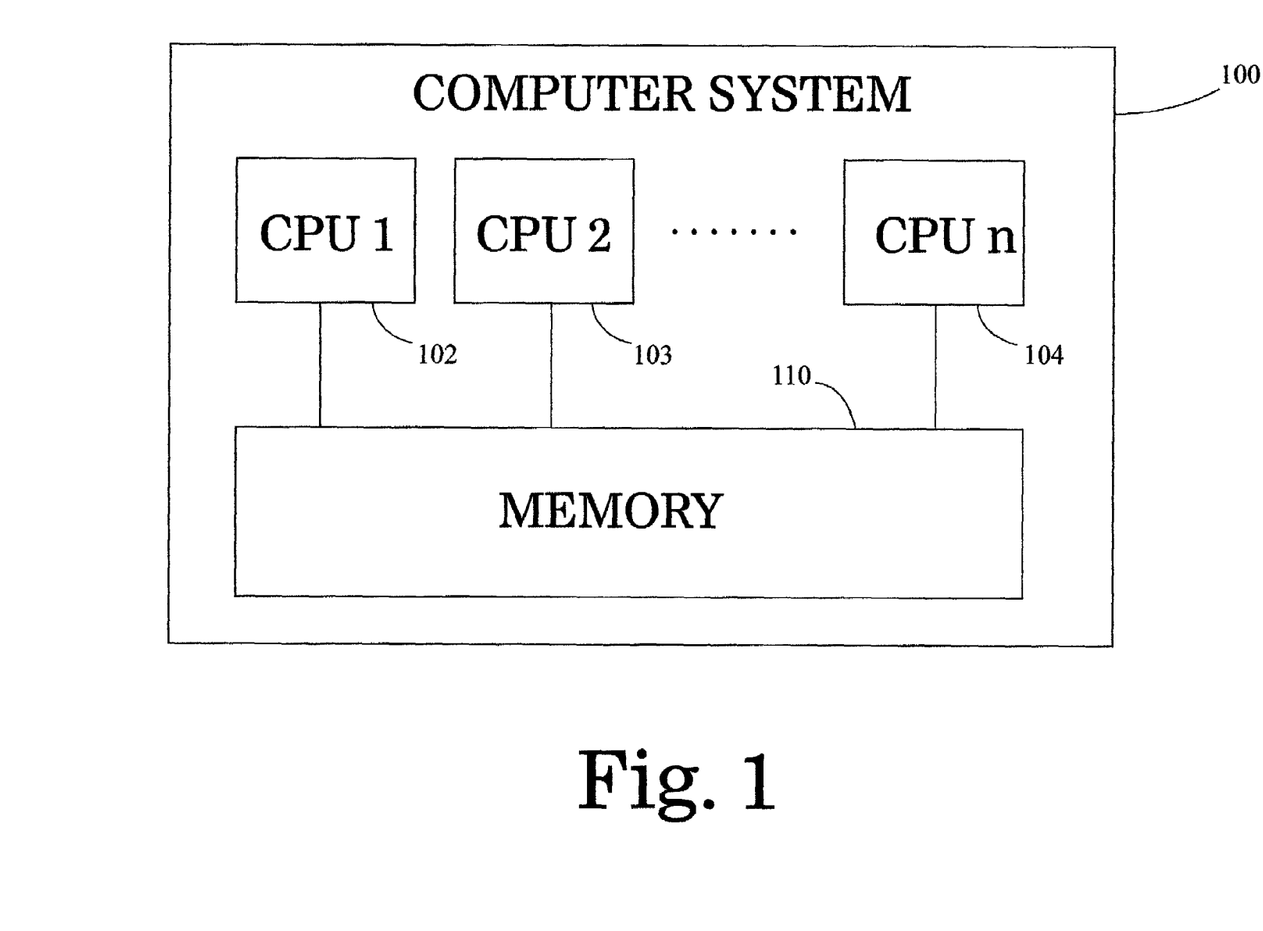
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the preferred embodiment is described in a particular hardware environment, those skilled in the art will recognize and appreciate that this is meant to be illustrative and not restrictive of the present invention. Accordingly, other alternative hardware environments may be used without departing from the scope of the present invention.

Figure 2:
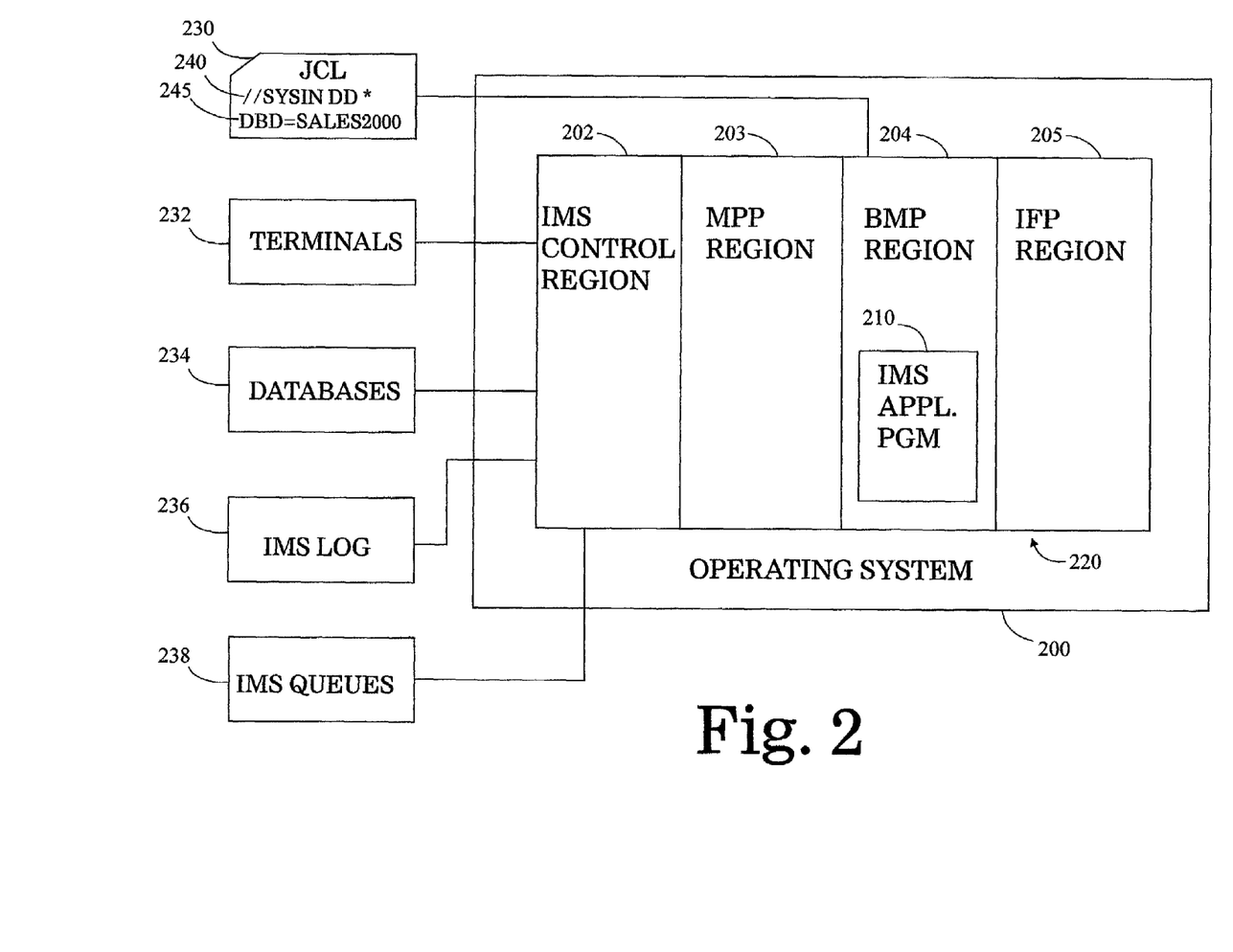
FIG. 2 is a block diagram of an exemplary IMS subsystem including an IMS application program in accordance with the present invention.

Referring now to FIG. 2, a block diagram is shown illustrating an exemplary operating system 200, such as the MVS/ESA operating system, suitable for managing the resources of computer system 100 and providing the framework for running other computing subsystems and application programs. (MVS/ESA is a trademark of International Business Machines Corporation in the United States, other countries, or both.) Subsystems functionally capable of being provided under the MVS/ESA operating system include the IMS subsystem 220. The IMS subsystem 220 comprises an IMS control region 202, which manages the region resources comprising Message Processing Program (MPP) region 203, Batch Message Processing (BMP) region 204, and Interactive Fast Path (IFP) region 205. Other resources that communicate with, or are managed by, IMS control region 202 comprise terminals 232, databases 234, logs 236, queues 238 and job control language (JCL) 230. Databases 234 comprise several different types of IMS databases, such as DEDB, HDAM and HIDAM.

Regions 203–205 are eligible for running application programs in accordance with the preferred embodiment. BMP region 204 comprises exemplary IMS application program 210 invoked as a BMP batch application program via JCL 230. Those skilled in the art will recognize that FIG. 2 is exemplary in nature and that many other IMS subsystem configurations are possible within the scope of the present invention. For example, in an alternative configuration, application program 210 could execute in MPP region 203. Further, IFP region 205 need not exist and other regions, such as an IMS DLI or DBB region, could exist.

Generally, application program 210 is tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD Rom, diskette, hard drive and the like, as well as other non-palpable physical media such as a carrier signal, whether over wires or wireless, when the program is distributed electronically.

Figure 3:
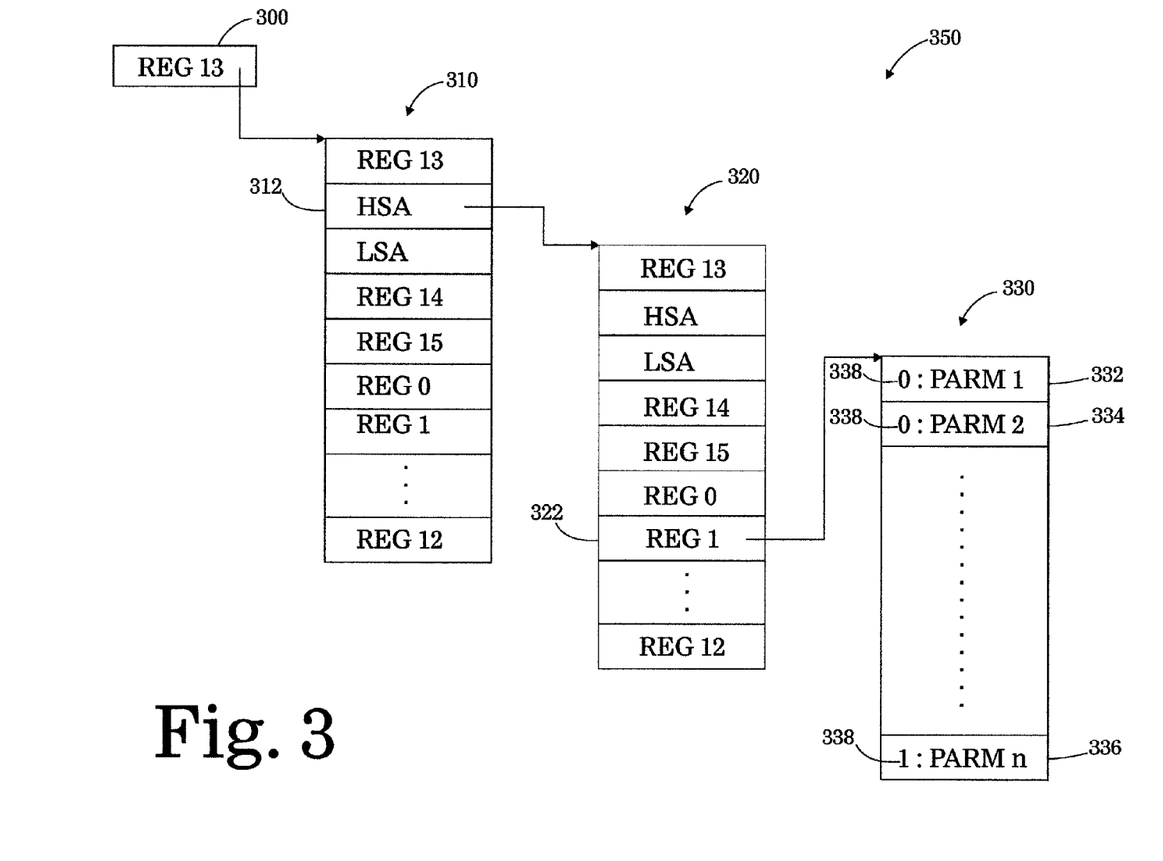
FIG. 3 is a data structure utilized by the present invention.

Referring now to FIG. 3, a data structure is shown that is available to an IMS application program upon its invocation that is utilized by the preferred embodiment. Computer register 13 (reference numeral 300) contains the computer memory address (henceforth referred to as "address" or "pointer") of the program save Area 310. The High Save Area (HSA) pointer 312 within the program save area 310 contains the address of the calling program's save area 320. The calling program's saved computer register 1 (reference numeral 322) within the calling program's save area 320 contains the address of the passed parameter list 330. Parameter list 330 contains a contiguous list of parameter list entries 332–336 which are in the form of full word (4 byte) addresses. Each non-zero address 332–336 points to a candidate PCB. A candidate PCB can either be an actual PCB or a pointer to an actual PCB, as explained in greater detail below. The last parameter 336 in parameter list 330 is designated by a 1 in the high order bit position 338 of parmlist entry 336.

Figure 4:
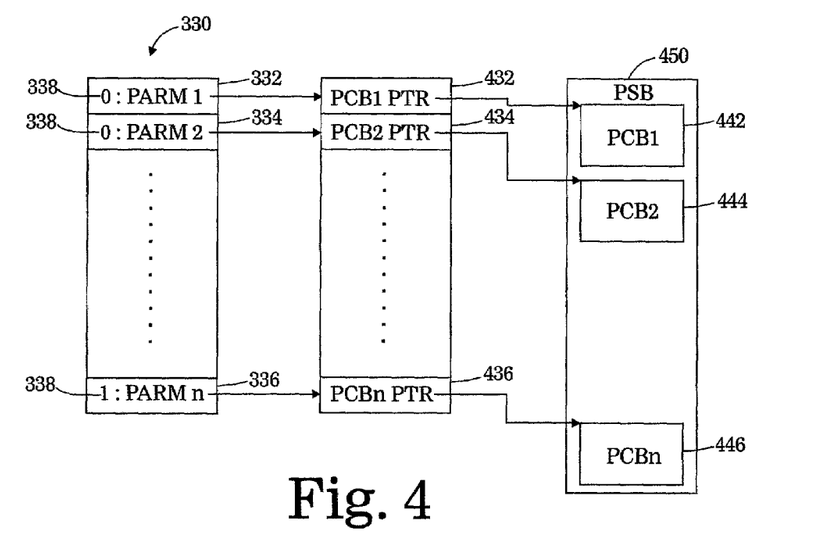
FIG. 4 is a data structure utilized by the present invention in a PL/I environment.
Figure 5:
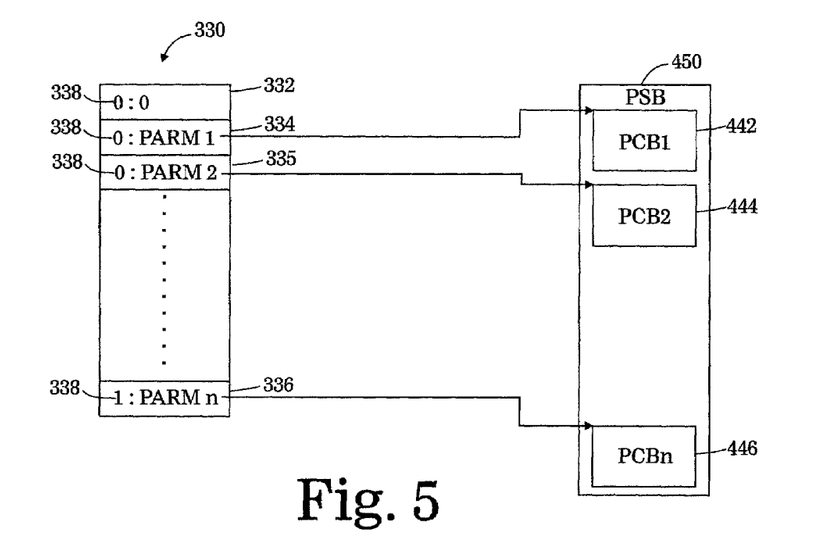
FIG. 5 is a data structure utilized by the present invention in a PASCAL environment.
Figure 6:
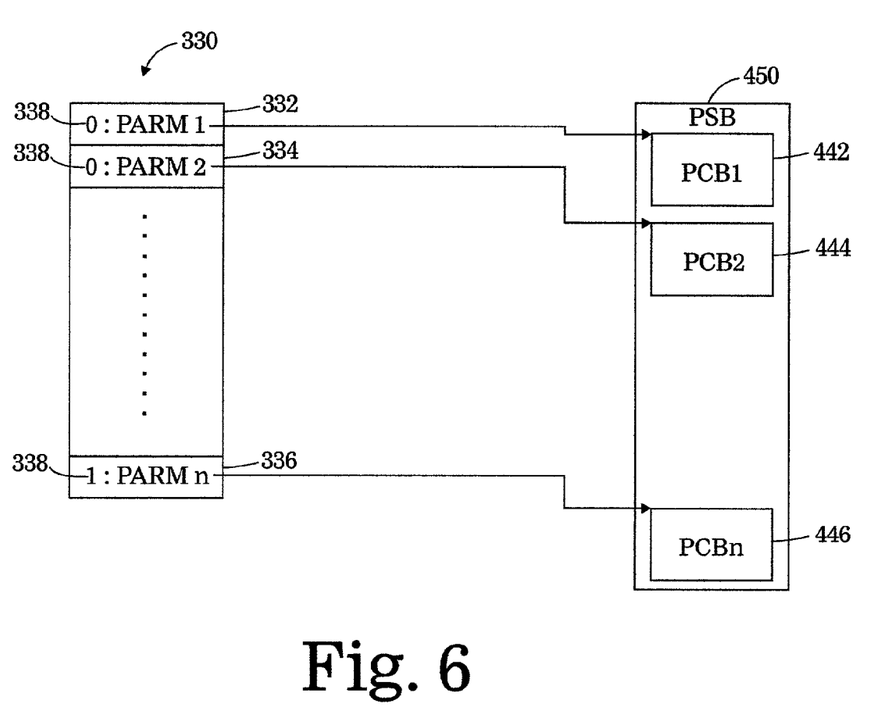
FIG. 6 is a data structure utilized by the present invention in a COBOL, Assembler or C environment.

Referring now to FIGS. 4, 5 and 6, there is shown three possible data structures, only one of which will exist during a particular execution of the application program 210. Determining which of these figures will apply depends from the programming language specified during the PSBGEN process associated with the required IMS resources.

If PL/I was specified during the PSBGEN process then FIG. 4 will apply. In this environment parameter list entry 332 points to a candidate PCB 432. Through an evaluation process explained in greater detail below, the candidate PCB 432 fails to qualify as an actual PCB. In this case, the candidate PCB 432 comprises a pointer to an actual PCB 442. In like manner, the parameter list entries 334 and 336 also point to the candidate PCBs 434 and 436, respectively; which in turn also fail to qualify as actual PCBs and accordingly point to the actual PCBs 444 and 446, respectively.

If PASCAL was specified during the PSBGEN process, then FIG. 5 will apply. In this environment the first parameter list entry 332 has been set to a value of zero, and accordingly the preferred embodiment skips the first parameter list entry 332 of the parameter list 330 and begins processing with the second parameter list entry 334. Parameter list entry 334 points to the candidate PCB 442. Through an evaluation process, explained in greater detail below, the candidate PCB 442 qualifies as an actual PCB 442. In like manner, the parameter list entries 335 and 336 also point to the candidate PCBs 444 and 446, respectively which are also qualified to be the actual PCBs 444 and 446, respectively.

If neither PL/I nor PASCAL was specified during the PSBGEN process, then FIG. 6 will apply. In this environment the first parameter list entry 332 points to the candidate PCB 442. Through an evaluation process explained in greater detail below, the candidate PCB 442 qualifies as an actual PCB 442. In like manner, the parameter list entries 334 and 336 also point to the candidate PCBs 444 and 446, respectively which are also qualified to be the actual PCBs 444 and 446, respectively.

Figure 7:
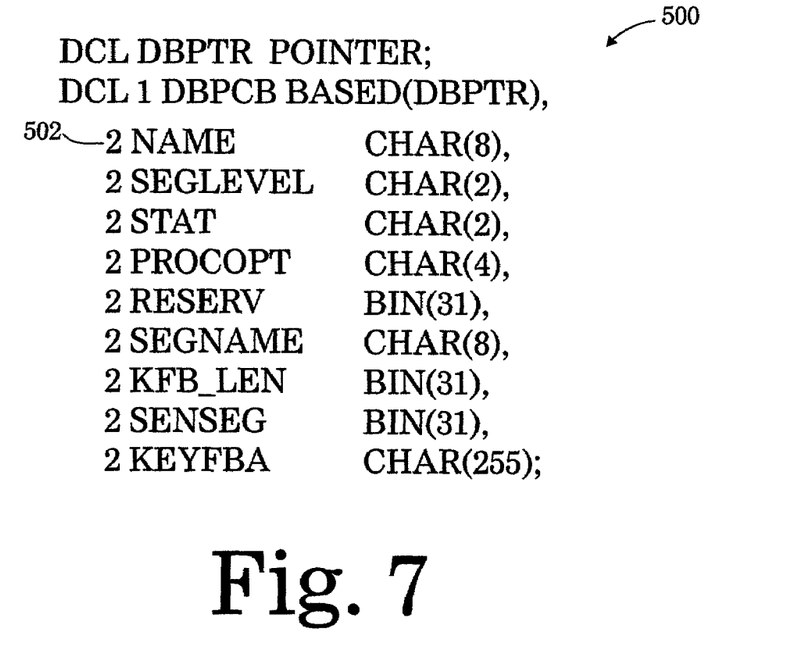
FIG. 7 represents the data structure for a database PCB.
Figure 8:
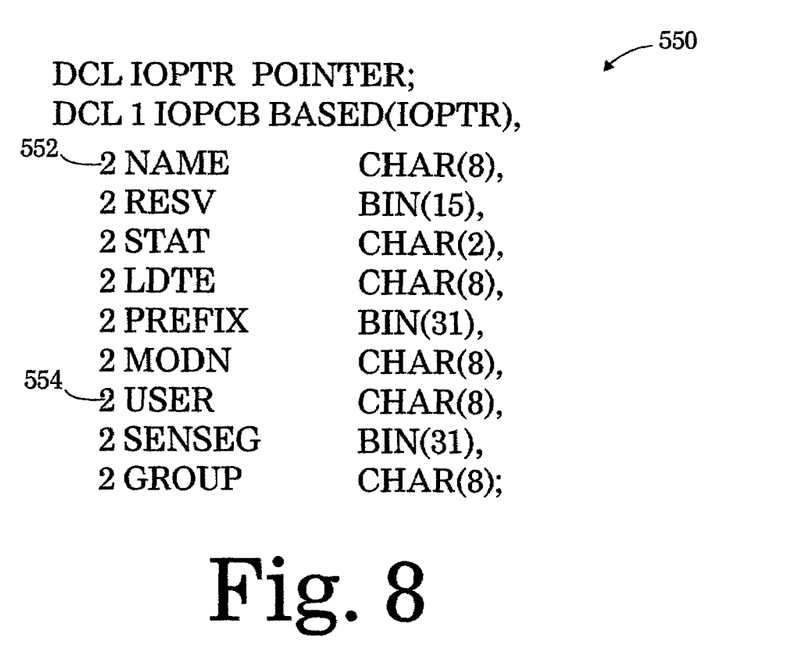
FIG. 8 represents the data structure for an I/O PCB.

FIG. 7 and FIG. 8 depict the data area layout for a database PCB and an I/O PCB, respectively. The preferred embodiment will test fields within data areas 500 and 550 in performing the novel methods explained below. Those skilled in the art will recognize that referencing PCB data area fields by name, such as USER 554, precisely identifies the corresponding data field by data area offset and field length.

Figure 9:
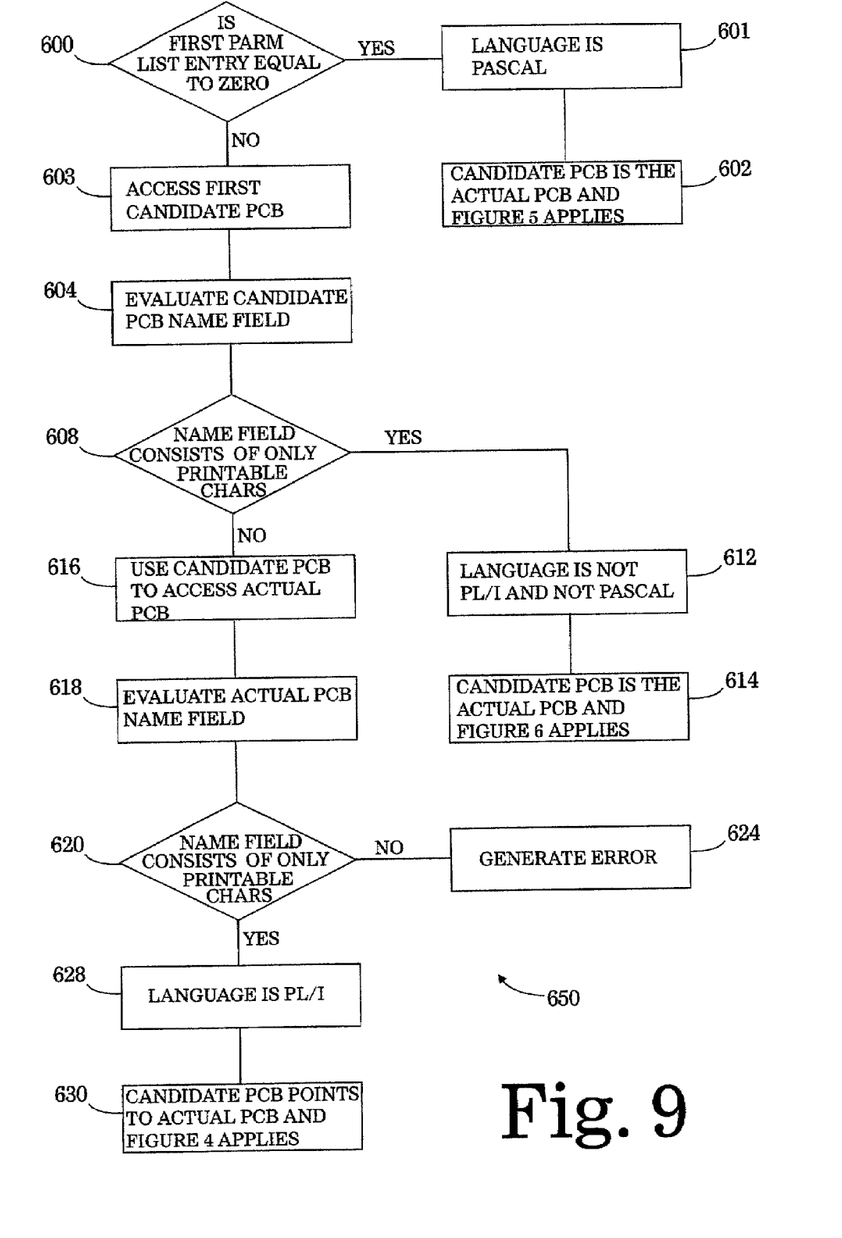
FIG. 9 is a flow diagram in accordance with one aspect of the present invention.

Referring now to FIG. 9, in conjunction with the data structures shown in FIGS. 2, 3, 4, 5, 6, 7, and 8, a flow diagram 650 illustrates one aspect of the preferred embodiment whereby a dynamic determination during the execution of application program 210 is made as to whether or not a PSB was generated with PL/I (FIG. 4), PASCAL (FIG. 5), or another programming language (FIG. 6). As previously explained, this dynamic determination capability facilitates construct form independence by providing for the use of a preexisting PSB representing needed IMS resources without regard to considerations for the language used during the corresponding PSB generation.

Step 600, by traversing data structure 350 of FIG. 3, gains access to the parameter list 330 and tests the first parameter list entry 332 for a value of zero. If the parameter list entry 332 is zero then, in step 601 it is determined that the language environment is PASCAL. In step 602 it is further concluded that FIG. 5 applies for this execution of application program 210 wherein the parameter list entries 334–336 point to the candidate PCBs 442–446, respectively, which are qualified as the actual PCBs 442–446, respectively. Otherwise, returning now to step 600, if the parameter list entry 332 is non-zero then processing continues with step 603.

Step 603 gains access to the first candidate PCB utilizing the parameter list 330 and the first parameter list entry 332. The name field 502 of the first candidate PCB 432 (FIG. 4) or 442 (FIG. 6) is evaluated in step 604. In step 608, if the name field 502 consists of only printable characters (comprising alphanumeric or special characters such as "&" or "%") then in step 612 it is determined that the PSB 450 was generated with a language other than PL/I and PASCAL. In step 614 it is further concluded that FIG. 6 applies for this execution of the application program 210 wherein the parameter list entries 332–336 point to the candidate PCBs 442–446, respectively, which are qualified as the actual PCBs 442–446, respectively. Otherwise, returning now to step 608, if the name field 502 is not comprised of only printable characters then processing continues with step 616.

In step 616 the first word of the candidate PCB 432 is used as a pointer to access the first actual PCB 442. The first actual PCB 442 name field 502 is evaluated in step 618. In step 620, if the name field 502 of the first actual PCB 442 consists of only printable characters then in step 628 it is determined that the language used to generate PSB 450 was PL/I. In step 630, it is further concluded that FIG. 4 applies wherein the parameter list entries 332–336 point to the candidate PCBs 432–436, respectively, which in turn point to the actual PCBs 442–446, respectively for this execution of the application program 210. Otherwise, returning now to step 620, if the name field 502 does not consist of only printable characters then an actual PCB 442 could not be found, and accordingly an error condition is generated in step 624 to reflect this erroneous computational state.

Figure 10:
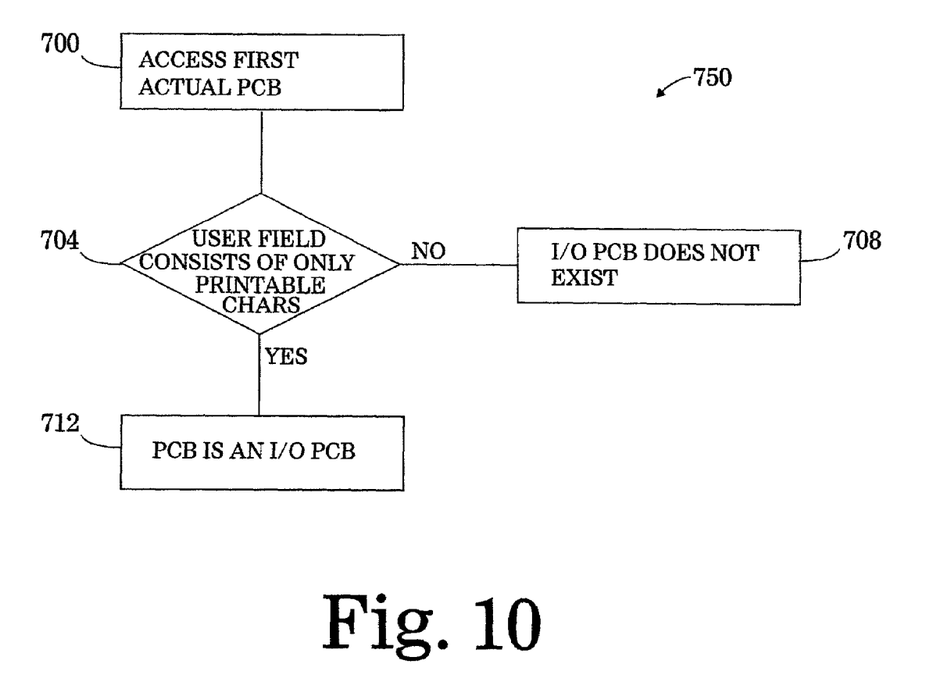
FIG. 10 is a flow diagram in accordance with another aspect of the present invention.

Referring now to FIG. 10, in conjunction with data structures shown in FIGS. 2, 3, 4, 5, 6, 7, and 8, a flow diagram 750 illustrates another aspect of the preferred embodiment whereby a dynamic determination during application program execution is made as to whether or not an I/O PCB 550 exists. Making this PCB type determination dynamically within application program 210 is highly beneficial in that it allows application program 210 to perform optional processing if the I/O PCB 550 is present, and to bypass this optional processing if the I/O PCB 550 is not present. For example, checkpoint processing can only be requested from IMS subsystem 220 if an I/O PCB is present. Likewise, reading or writing messages to the IMS queues 238 can only be requested from IMS subsystem 220 if the I/O PCB exists. Prior art solutions would either always bypass these optional functions in order to relax requirements on the application program user, or force the user to produce an I/O PCB 550 which frequently would involve a cumbersome PSBGEN operation. In the former case, the benefits of certain optional processing, such as checkpoint, are lost. In the latter case, the application program user is encumbered with meeting additional requirements prior to application program execution.

The address of actual PCB 442 is known to the application program 210 from the flow diagram 650 shown in FIG. 9 and so utilized in step 700 to access the first actual PCB 442. Step 704 evaluates the USER field 554 to confirm that only printable characters are contained therein. If this is not the case, then it is determined in step 708 that the first actual PCB 442 is not an I/O PCB and accordingly the I/O PCB 550 does not exist for this execution of the application program 210. It is not necessary to look at other PCBs 444–446 because within the IMS subsystem 220 the I/O PCB 550, if it exists, is always the first actual PCB 442. Returning now to step 704, if it is the case that USER field 554 contains only printable characters, then, in step 712, it is determined that the first actual PCB 442 is an I/O PCB 550. Accordingly, since an I/O PCB exists, IMS checkpoint and message queue processing may be invoked by the application program 210.

Figure 11:
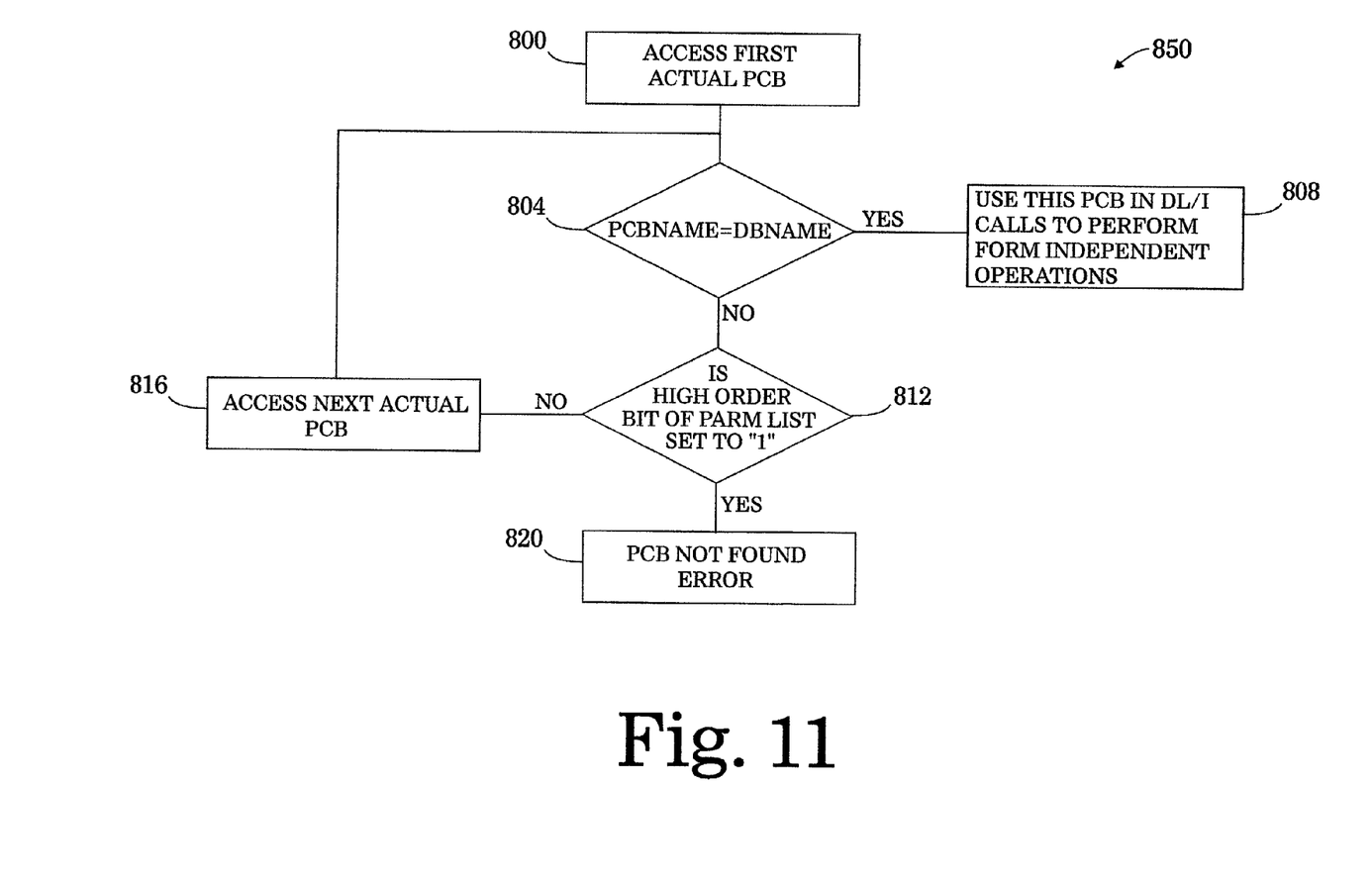
FIG. 11 is a flow diagram illustrating an additional aspect of the present invention.

Proceeding now with the flow diagram 850 of FIG. 11, in conjunction with the data structures shown in FIGS. 2, 3, 4, 5, 6, 7, and 8, another method of the preferred embodiment is shown for dynamically locating the actual PCB associated with database name 245. The application program 210 must have the name or names 245 of the particular databases 234 on which the various operations comprising application program 210 will be performed prior to calling the IMS subsystem 220. Those skilled in art will recognize that this name information can be obtained by the application program 210 in a variety of ways. First, the application program may have been written to execute with only predetermined ones of databases 234 and therefore the constant names can be coded into the application program 210. Typically, however, the database name or names are passed to the application program 210 as a parameter or control statement. For example, the name or names can be passed via JCL 230 utilizing a "//SYSIN DD" statement 240 wherein the database name "SALES2000" 245 is specified by the user of the application program 210. In this manner, more flexibility is achieved and application program 210 can operate on any of a variety of databases.

Step 800 of FIG. 11 begins by accessing the first actual PCB 442, as previously explained in the flow diagram 650 of FIG. 9. If, in step 804, the NAME field 502 matches the database name (for example, database name SALES2000 245) then it is determined in step 808 that the address of this actual PCB can be used in IMS DL/I calls to represent the particular database to be operated upon by application program 210. Otherwise, in step 812, a test is made to determine if additional PCBs 444–446 are available to check for a name match. This test is made by interrogating the high order bit 338 of the current parmlist 330 entry. If this bit is set to one, then the current PCB is the last PCB 446 and an error is generated in step 820 to reflect that a PCB matching the required database name (for example SALES2000 245) could not be found. Otherwise, additional PCBs are present and processing continues with step 816 where the next actual PCB is accessed. This step is accomplished utilizing the next sequential parameter list entry from parameter list 330 and either FIGS. 4, 5, or 6 as previously determined to be appropriate in the processing method shown in the flow diagram 650 of FIG. 9. Control then passes back to step 804 where once again the name check occurs as explained above.

The method of the preferred embodiment in accordance with the flow diagram 850 of FIG. 11 further facilitates construct form independence for an IMS application program. The conventional process of passing PCB addresses, whereby an application program must require PCBs to conform to certain quantity and order characteristics, is completely eliminated. Likewise, the cumbersome process of performing PSBGEN operations to create PCBs in the exact quantity and order required by application program is eliminated. Application programs created in accordance with the present invention make dynamic determinations to discover the appropriate PCBs to utilize, independent from PCB quantity and order characteristics.

Taken in combination, the flow diagrams 650, 750, and 850 shown in FIGS. 9, 10 and 11, respectively, provide for the creation of form independent IMS application programs wherein the requirements for application program execution are independent from the form of related IMS constructs. While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

What is claimed:

1. A method for performing on a computer system one or more form independent application program operations on at least one Information Management System (IMS) resource comprising:
    (a) locating a Program Communication Block (PCB) associated with said at least one IMS resource exclusive of predetermined knowledge pertaining to an IMS construct form, and (b) utilizing said PCB to perform said one or more form independent application program operations on said at least one IMS resource.

2. The method of claim 1 wherein said IMS resource is a database.

3. The method of claim 2 wherein said database is of a type selected from the group consisting of Data Entry Databases (DEDB), Hierarchic Direct Access Method (HDAM) and Hierarchic Indexed Direct Access Method (HIDAM).

4. The method of claim 3 wherein said application program operations include unloading said database.

5. The method of claim 3 wherein said application program operations include loading said database.

6. The method of claim 1 wherein said IMS construct form depends from the choice of programming language used to generate a Program Specification Block (PSB).

7. The method of claim 6 wherein said IMS construct form depends from the order of PCBs associated with said PSB.

8. The method of claim 1 wherein said application program operations are invoked from an application program executing in an IMS region selected from the group consisting of Batch Message Processing (BMP), Data Language One (DL/I), Database Management Batch (DBB), Message Processing Program (MPP) and Interactive Fast Path (IFP).

9. The method of claim 8 wherein locating a PCB further comprises locating an Input/Output (I/O) PCB.

10. The method of claim 8 wherein locating a PCB further comprises locating a database PCB.

11. The method of claim 6 wherein said PSB is associated with a language selected from the group consisting of COBOL, Assembly Language, PL/I, PASCAL and C.

12. The method of claim 7 wherein said IMS construct form additionally depends from the quantity of PCBs associated with said PSB.

13. The method of claim 9 wherein utilizing said PCB comprises utilizing said I/O PCB to perform checkpoint processing.

14. The method of claim 1 wherein step (a) comprises the steps of:
 (a1) locating a first candidate PCB,
 (a2) determining if said first candidate PCB is said PCB, and
 (a3) if said first candidate PCB is not said PCB, utilizing said first candidate PCB as a pointer to locate said PCB.

15. The method of claim 14 wherein said determining step comprises verifying that a name field of said first candidate PCB consists of only printable characters.

16. The method of claim 14 wherein said locating step comprises the steps of:
 (a1.1) utilizing a register 13 to access a program save area,
 (a1.2) utilizing a High Save Area (HSA) pointer from said program save area to access a calling program's save area,
 (a1.3) utilizing a saved register 1 from said calling program's save area to access a parameter list, and
 (a1.4) utilizing a parameter list entry from said parameter list to access said first candidate PCB.

17. The method of claim 16 further comprising:
 (a4) comparing a NAME field of said PCB with the name of said IMS resource to determine if said PCB is associated with said IMS resource,
 (a5) checking a high order bit of said parameter list entry if said PCB is not associated with said IMS resource, and (a6) obtaining a second candidate PCB by utilizing a next sequential parameter list entry from said parameter list and repeating steps (a2) through (a6) substituting said second candidate PCB for said first candidate PCB if said high order bit is not "1".

18. The method of claim 17 wherein step (a5) further comprises generating an error condition if said high order bit is "1".

19. A method for performing an application program operation on at least one Information Management System (IMS) database comprising:
 (a) ensuring the existence of IMS constructs representing said at least one IMS database without regard for construct form, and
 (b) executing a construct form independent application program for performing said application program operation on said IMS database.

20. A computer system for performing one or more form independent application program operations on at least one Information Management System (IMS) resource comprising:
 (a) a computer,
 (b) computer program first instructions executing on said computer for locating a Program Communication Block (PCB) associated with said at least one IMS resource exclusive of predetermined knowledge pertaining to an IMS construct form, and
 (c) computer program second instructions executing on said computer for performing said one or more form independent application program operations on said at least one IMS resource utilizing said PCB.

21. The system of claim 20 wherein said IMS resource is a database.

22. The system of claim 21 wherein said database is of a Hierarchic Direct Access Method (HDAM) type.

23. The system of claim 21 wherein said application program operations include unloading said database.

24. The system of claim 21 wherein said application program operations include loading said database.

25. The system of claim 20 wherein said IMS construct form depends from the choice of programming language used to generate a Program Specification Block (PSB).

26. The system of claim 25 wherein said IMS construct form depends from the order of PCBs associated with said PSB.

27. The system of claim 20 wherein said application program operations are invoked from an application program executing in an IMS Batch Message Processing (BMP) region.

28. The system of claim 27 wherein said computer program first instructions locate an Input/Output (I/O) PCB.

29. The system of claim 27 wherein said computer program first instructions locate a database PCB.

30. The system of claim 25 wherein said PSB is associated with COBOL.

31. The system of claim 26 wherein said IMS construct form additionally depends from the quantity of PCBs associated with said PSB.

32. The system of claim 28 wherein said computer program second instructions use said I/O PCB to perform message queue processing.

33. The system of claim 20 wherein said computer program first instructions perform a method for locating said PCB, said method comprising:
 (a1) locating a first candidate PCB,
 (a2) determining if said first candidate PCB is said PCB, and (a3) locating said PCB utilizing said first candidate PCB if said first candidate PCB is not said PCB.

34. The system of claim 33 wherein (a2) comprises verifying that a name field of said first candidate PCB consists of only printable characters.

35. The system of claim 33 wherein (a1) comprises:
(a1.1) locating a program save area,
(a1.2) locating a calling program's save area utilizing said program save area,
(a1.3) locating a parameter list utilizing said calling program's save area, and
(a1.4) locating said first candidate PCB utilizing said parameter list.

36. The system of claim 33 further comprising:
(a4) determining if said PCB is associated with said IMS resource,
(a5) checking for the existence of a second candidate PCB if said PCB is not associated with said IMS resource, and
(a6) repeating (a2) through (a6) substituting said second candidate PCB for said first candidate PCB if said second candidate PCB exists.

37. The system of claim 36 wherein (a5) further comprises generating an error condition if said second candidate PCB does not exist.

38. An article of manufacture including a palpable physical media for use in a computer system tangibly embodying a program of instructions executable by the computer system to perform method steps for performing one or more form independent application program operations on at least one Information Management System (IMS) resource, the method comprising the following steps:
(a) locating a Program Communication Block (PCB) associated with the at least one IMS resource exclusive of predetermined knowledge pertaining to an IMS construct form, and
(b) utilizing the PCB to perform the one or more form independent application program operations on the at least one IMS resource.

39. The article of manufacture of claim 38 wherein the IMS resource is a database.

40. The article of manufacture of claim 38 wherein the IMS construct form depends from a characteristic selected from the group consisting of Program Specification Block (PSB) programming language, PCB order, and PCB quantity.

41. The article of manufacture of claim 38 wherein step (a) comprises locating an Input/Output (I/O) PCB.

42. The article of manufacture of claim 41 wherein step (b) comprises utilizing the I/O PCB to perform checkpoint processing.

43. The article of manufacture of claim 38 wherein step (a) comprises the steps of:
(a1) accessing a first candidate PCB,
(a2) evaluating whether the first candidate PCB is the PCB, and
(a3) utilizing information from the first candidate PCB to access the PCB if the first candidate PCB is not the PCB.

44. The article of manufacture of claim 43 wherein the evaluation step (a2) comprises determining if a name field of the first candidate PCB consists of only printable characters.

45. The article of manufacture of claim 43 wherein the accessing step (a1) comprises the steps of:
(a1.1) utilizing a memory address from a register 13 to access a program save area,
(a1.2) utilizing a memory address from the program save area to access a calling program's save area,
(a1.3) utilizing a memory address from the calling program's save area to access a parameter list, and
(a1.4) utilizing a memory address from the parameter list to access the first candidate PCB.

46. The article of manufacture of claim 43 further comprising:
(a4) determining if the PCB is associated with the IMS resource,
(a5) checking for the existence of a second candidate PCB if the PCB is not associated with the IMS resource, and
(a6) repeating steps (a2) through (a6) with substitution of the second candidate PCB for the first candidate PCB if the second candidate PCB exists.

47. The article of manufacture of claim 46 wherein step (a5) further comprises generating an error condition if the second candidate PCB does not exist.

48. The article of manufacture of claim 45 further comprising:
(a1.5) determining that the language environment is PASCAL if a parameter list entry in the first entry location of the parameter list is zero.

\* \* \* \* \*